(12) United States Patent
Talwar et al.

(10) Patent No.: US 8,984,257 B2
(45) Date of Patent: Mar. 17, 2015

(54) MANAGING SENSOR AND ACTUATOR DATA FOR A PROCESSOR AND SERVICE PROCESSOR LOCATED ON A COMMON SOCKET

(75) Inventors: Vanish Talwar, Campbell, CA (US); Jeffrey R. Hilland, Cedar Park, TX (US); Vidhya Kannan, Bangalore (IN); Sandeep KS, Bangalore (IN); Prashanth V, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1207 days.

(21) Appl. No.: 12/755,083

(22) Filed: Apr. 6, 2010

(65) Prior Publication Data

US 2011/0246748 A1   Oct. 6, 2011

(51) Int. Cl.
   *G06F 15/00*   (2006.01)
   *G06F 15/76*   (2006.01)
   *G06F 9/50*   (2006.01)

(52) U.S. Cl.
   CPC .................... *G06F 9/5077* (2013.01)
   USPC ......................................................... 712/30

(58) Field of Classification Search
   None
   See application file for complete search history.

(56) References Cited

U.S. PATENT DOCUMENTS

| | | | |
|---|---|---|---|
| 2006/0095551 A1* | 5/2006 | Leung et al. | 709/223 |
| 2007/0038732 A1* | 2/2007 | Chandwani et al. | 709/223 |
| 2010/0094981 A1* | 4/2010 | Cordray et al. | 709/222 |
| 2010/0293131 A1* | 11/2010 | Qi et al. | 706/52 |

OTHER PUBLICATIONS

Sailer et al. (Attestation-based Policy Enforcement for Remote Access, Oct. 2004, pp. 308-317).*
Madden et al. (TinyDB: An Acquisitional Query Processing System for Sensor Networks, Mar. 2005, pp. 122-173).*
Dahal, et al. (Wide Area Monitoring using Common Information Model and Sensor Web, Mar. 2009, pp. 1-7).*

* cited by examiner

*Primary Examiner* — George Giroux
(74) *Attorney, Agent, or Firm* — Hewlett-Packard Patent Department

(57) ABSTRACT

Illustrated is a system and method that includes a processor and service processor co-located on a common socket, the service processor to aggregate data from a distributed network of additional service processors and processors both of which are co-located on an additional common socket. The system and method also includes a first sensor to record the data from the processor. The system and method also includes a second sensor to record the data from a software stack. The system and method further includes a registry to store the data.

21 Claims, 18 Drawing Sheets

FIG. 5

```
UNIFIED SYSTEM STATUS | REMOTE CONSOLE | VIRTUAL MEDIA | POWER MANAGEMENT | ADMINSTRATION
```

311

SERVICE PROCESSOR                                    HELP  LOG OUT

SYSTEM | FANS | TEMPERATURES | POWER | PROCESSORS | MEMORY | NIC | HYPERVISORS | VMs — 503

- 501
- 502

AUTO DISCOVERY
○ OFF
◉ ON

MANUAL DISCOVERY

LOCAL HOST
- SERVER NAME: HP-242432FWR
- UUID: 32423423F42F
- SSN/PROD. ID: CN42424/FRG33
- SERVICE PROCESSOR NAME: STSD-15-1545-126-142
- LICENSE TYPE: GPLv3
- SERVICE PROCESSOR FIRMWARE: 1.50 PASS 16B 3/09/2009
- IP ADDRESS: 92.134.134.134    — 504

HYPERVISOR -FF42A
- HYPERVISOR TYPE: XEN
- VERSION: 3.0
- MANAGEMENT ADDRESS: 123.1.23.254   — 505

VIRTUAL MACHINE -DD567 -4444D

MBR-DOM-0-1

SLES21-S104
- OS TYPE: UBUNTU
- VERSION: 4.5
- IP ADDRESS: 111.2.121.234   — 506

FIG. 7

| MANAGEMENT DOMAIN | ADDRESSING | DESCRIPTION | ARRAY OF {CLASSNAME, NAMESPACE, PROVIDER NAME, PROVIDER TYPE} |
|---|---|---|---|
| SERVICE PROCESSOR | 33.2.111.254 | iLOv2 | [{CIM_POWERMANAGEMENTSERVICE, ROOT/CIM_POWERMANAGEMENTSERVICE}, |
| DOM-0 | 133.2.131.234 | DOM-0 | [{POWER_INSTANCE,ROOT/CIM2,POWER PROVIDER,INSTANCE}, |
| GUEST VM1 | 123.2.121.234 | Apache_VM | [{APACHE_PERF,ROOT/CIM2,APACHE PERFORMANCE MONITOR |
| GUEST VM2 | 111.2.121.234 | UBUNTU_VM | [{UBUNTU_PERF,ROOT/CIM2,UBUNTU PERFORMANCE MONITOR |

1401 — TRANSMIT A PEER DISCOVERY QUERY TO IDENTIFY AT LEAST ONE PROCESSOR AND SERVICE PROCESSOR CO-LOCATED ON A COMMON SOCKET, THE PROCESSOR AND THE SERVICE PROCESSOR INCLUDING AT LEAST ONE DATA SENSOR

1402 — RECEIVE A RESPONSE TO THE PEER DISCOVERY QUERY, THE RESPONSE IDENTIFYING THE AT LEAST ONE DATA SENSOR AND THE PROCESSOR AND THE SERVICE PROCESSOR CO-LOCATED ON THE COMMON SOCKET

1403 — UPDATE A REGISTRY WITH THE RESPONSE, THE REGISTRY ACCESSIBLE BY THE PROCESSOR AND SERVICE PROCESSOR CO-LOCATED ON THE COMMON SOCKET

1404 — RECEIVE AN ADDITIONAL PEER DISCOVERY QUERY SEEKING SENSOR DATA RELATED TO AN ADDITIONAL PROCESSOR AND SERVICE PROCESSOR CO-LOCATED ON AN ADDITIONAL COMMON SOCKET

1405 — ROUTE THE ADDITIONAL PEER DISCOVERY QUERY TO THE ADDITIONAL PROCESSOR AND SERVICE PROCESSOR CO-LOCATED ON THE ADDITIONAL COMMON SOCKET

1406 — GENERATE AN ADDITIONAL PEER DISCOVERY QUERY SEEKING SENSOR DATA RELATED TO AN ADDITIONAL PROCESSOR AND SERVICE PROCESSOR CO-LOCATED ON AN ADDITIONAL COMMON SOCKET, THE PEER DISCOVERY QUERY GENERATED USING A COMMON INFORMATION MODEL (CIM) NAMESPACE

1407 — ROUTE THE PEER DISCOVERY QUERY TO THE ADDITIONAL PROCESSOR AND SERVICE PROCESSOR CO-LOCATED ON AN ADDITIONAL COMMON SOCKET USING A DISTRIBUTED HASH TABLE (DHT)

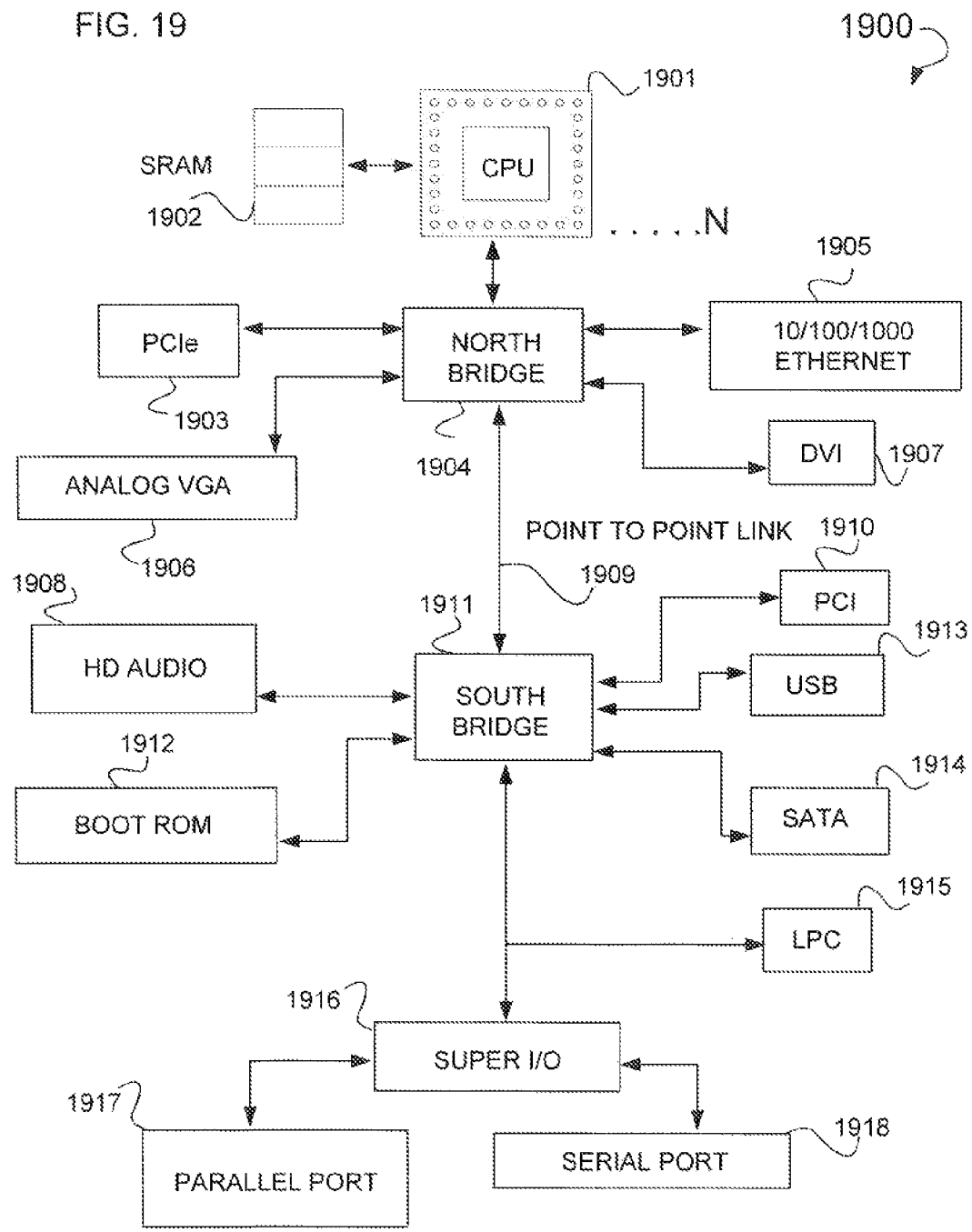

MANAGING SENSOR AND ACTUATOR DATA FOR A PROCESSOR AND SERVICE PROCESSOR LOCATED ON A COMMON SOCKET

CROSS REFERENCE TO RELATED APPLICATIONS

This is non-provisional patent application related to U.S. patent application Ser. No. 12/243,111 titled "Coordinated Management In Virtualized Systems Using Management Brokers And Management Channels" that was filed on Oct. 1, 2008, and which is incorporated by reference in its entirety.

BACKGROUND

Service processors are processors, or other types of integrated circuits, that are used to manage or co-manage, alongside or part of one or more general purpose processors, specific functionality in a computer system. This functionality may include computer system diagnostics, power resource management, and remote computer system configuration and management. There is no direct communication between service processors, that is the service processors are horizontally and/or vertically silo-ed. Some example service processors include Hewlett-Packard Company's INTEGRATED LIGHTS OUT™ (iLO) series of service processors.

Vertically silo-ed means that a separate infrastructure exists for monitoring the hardware, virtualization, and application stacks. Horizontal silo-ed means that there is no direct communication among the peers, as a result the aggregation and correlation is performed at a centralized location. A peer is a service processor. This central location may be a management computer system or management blade.

Monitoring may involve the use of various hardware (HW) and/or Software (SW) stack sensor and actuators that monitor the functionality of the HW/SW stacks. These sensors and actuators may be used in the aforementioned computer system diagnostics, power resource management, and remote computer system configuration and management.

BRIEF DESCRIPTION OF THE DRAWINGS

Some embodiments of the invention are described, by way of example, with respect to the following figures:

FIG. 5 is a diagram of a console, according to an example embodiment, in the form of a Graphical User Interface (GUI) used to monitor and manage the HW/SW stack of a plurality of domains.

FIG. 7 is a helper registry, according to an example embodiment, that includes data for a local domain.

FIG. 14 is a flow chart illustrating a method, according to an example embodiment, used to forward a sensor data query.

FIG. 19 is a diagram of a computer system, according to an example embodiment.

DETAILED DESCRIPTION

Illustrated is a system and method for resource management for unified and automated monitoring across the hardware and software stacks in a distributed system. This system and method may be used to manage vertically and horizontally silo-ed HW/SW stacks. Manage, as used herein, includes recording and making available for display sensor and actuator data relating to the HW/SW stacks. The overall system and method includes: (i) federated registry and proxy services for automating the discovery of sensors and actuators across HW/SW stacks and node boundaries and dynamic routing of queries to these sensors and actuators; (ii) distributed brokers for executing monitoring correlation and aggregation policies in a scalable manner. The system and method is instantiated in the service processor and in a special virtual platform appliance on every node.

Figure 1:
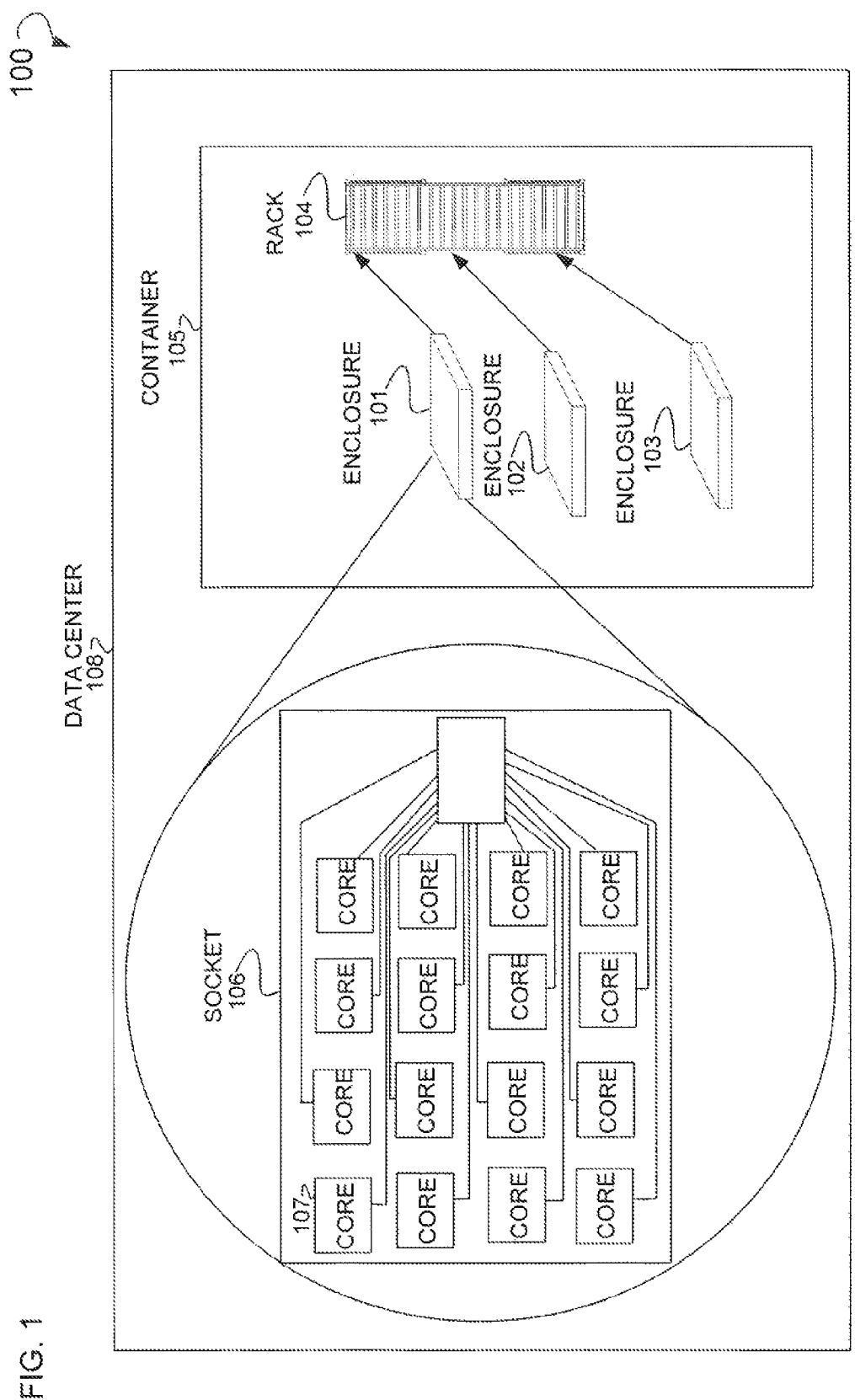
FIG. 1 is a block diagram of an architecture, according to an example embodiment, illustrating the hierarchical organization of the various components that make up the hardware stack.

FIG. 1 is a block diagram of an example architecture 100 illustrating the hierarchical organization of the various components that make up the hardware stack. Shown is a core 107 that resides, along with other cores, as part of a socket 106. This socket 106 is, in turn, part of an enclosure 101. The enclosures 101-103 are part of a rack 104. An example an enclosure 101 or 102 is a compute blade. The rack 104 is part of a container 105. The container 105 is part of a data center 108.

Figure 2:
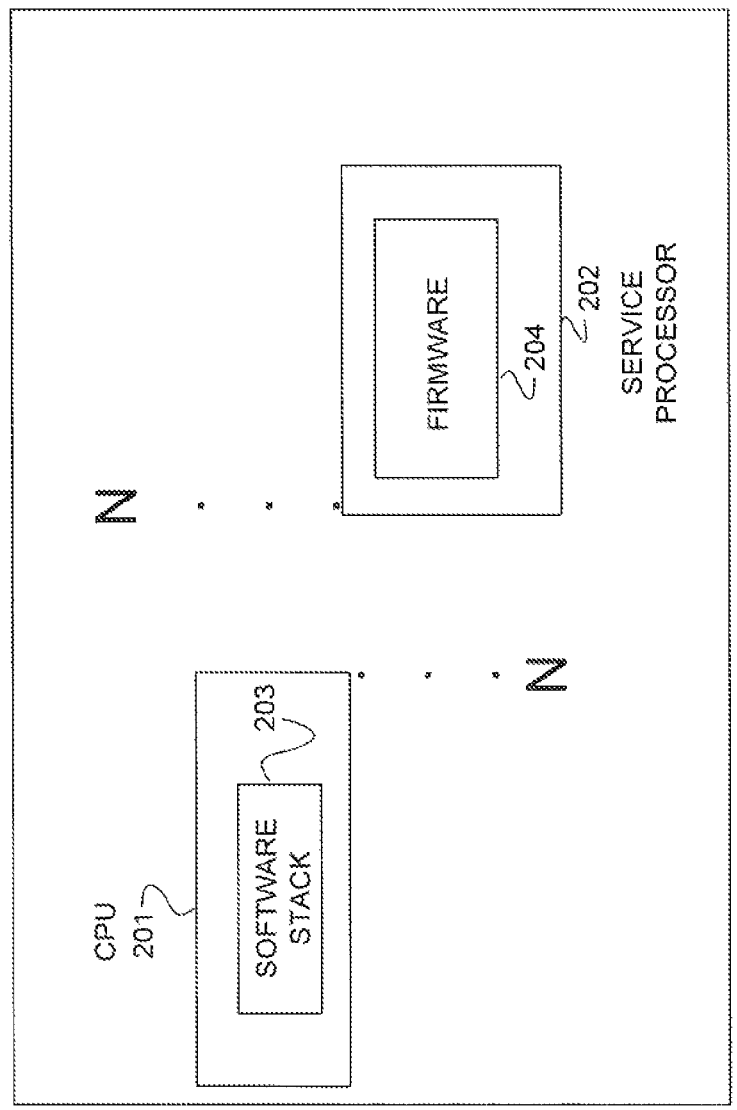
FIG. 2 is a block diagram of an exploded view of a socket, according to an example embodiment, that includes a service processor.

FIG. 2 is a block diagram of an exploded view of an example socket 106 that includes the service processor. Shown is the socket 106 that includes at least one Central Processing Unit (CPU) 201. Residing on this CPU 201 is a SW stack 203. Also shown is a service processor 202 that is co-located on the socket 106 with the CPU 201. In some example embodiments, the service processor 202 and CPU 201 are associated in a one-to-one or one-to-many relationship. This service processor 202 may be a CPU, accelerator, Graphical Processing Unit (GPU), or other suitable processor. Residing on the service processor 202 is firmware 204.

Figure 3:
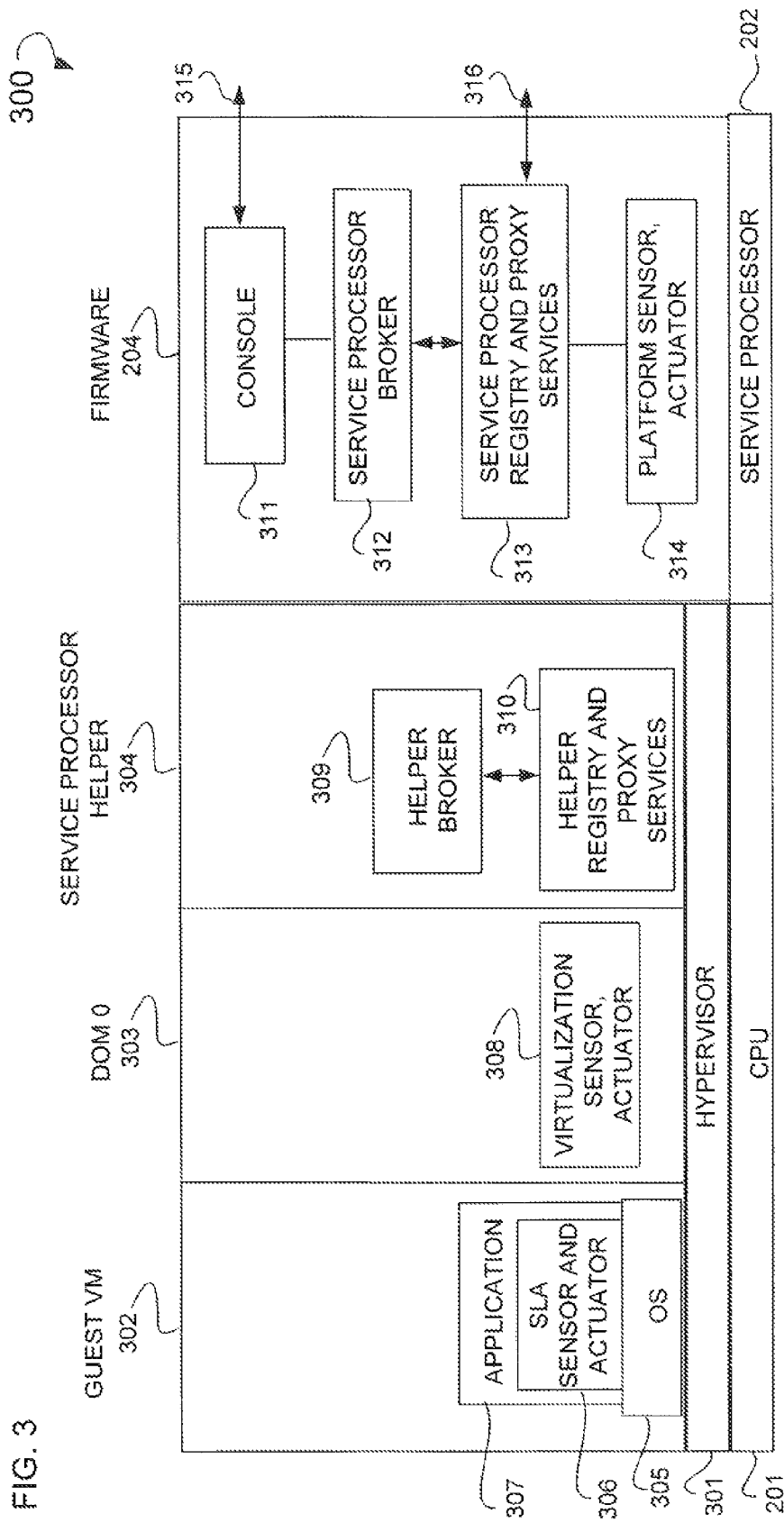
FIG. 3 is block diagram of a software stack, according to an example embodiment, for a system and method for resource management for unified and automated monitoring across the hardware and software stacks in a distributed system, the monitoring occurring in a virtualized environment.

FIG. 3 is block diagram of an example software stack 300 for a system and method for resource management for unified and automated monitoring across the hardware and software stacks in a distributed system, the monitoring occurring in a virtualized environment. Shown is a hypervisor 301, guest Virtual Machine (VM) 302. Dom0 303, and service processor helper 304 that collectively make up the SW stack 203. The hypervisor 301 may be an XEN™ hypervisor, or other suitable hypervisor. The service processor helper 304 may reside as part of the guest VM 302 or the DOM0 303, or be a separate module that resides on the hypervisor 301. Residing as part of the guest VM 302 is an OS 305, Service Level Agreement (SLA) sensor and actuator 306, and an application 307. The OS 305 may be a LINUX™, WINDOWS™, or another suitable operating system. The SLA sensors and actuators 306 may be an application that monitors SW stack performance to ensure that it is consistent with the terms of a SLA covering SW stack performance. This SW stack performance may include execution times associated with the application 307, or other performance information related to the application 307. The application 307 may be a map-reduce, social networking, e-commerce solution, multitier web applications, video streaming, or other suitable application. In some example embodiments, a plurality of guest VMs 302 may reside on the CPU 201. Included as part of the Dom0 303 is a virtualization sensor and actuator 308 that is used by the Dom0 303 to monitor the various guest VMs 302 and their respective performance. The performance issues related to the guest VM 302 may include memory utilization issues associated with the guest VM 302.

Further illustrated, is the service processor helper 304 that acts as a platform virtual appliance to allow the service processor 202 to manage the HW/SW stack of the CPU 201. Shown is the helper registry and proxy services 310 that is responsible for the: (i) auto-discovery of sensors and actuators across the HW/SW stack, (ii) subsequent registration of the individual namespaces of these sensors and actuators, and (iii) once registered, doing a dynamic redirection of query calls (i.e., proxy functionality) to the appropriate sensors and actuators in the socket 106. On top of the helper registry and proxy services 310 exists a helper broker 309 responsible for executing, monitoring correlation and aggregation policies in a scalable and coordinated manner. These policies relate to one or more of the guest VM 302. The helper broker 309 and helper registry and proxy service 310 are used to resolve vertical silos across the HW/SW layer of the CPU 201 (i.e., a local domain) through the monitoring of sensors and actuators within the management domain of the CPU 201. This registration process may be repeated periodically using a lease-based mechanism so as to support dynamism occurring in the system (e.g., VMs entry/exit/migrations, HW upgrades etc.).

Additionally shown is the firmware 204 that includes the console 311, service processor broker 312, service processor registry and proxy services 313, and platform sensors and actuator 314. The console 311 allows users of the system and method illustrated herein to monitor and manage the HW/SW stack of, for example, the enclosures 101-103 through the use of a dashboard, GUI, CLI, internet browser, or other suitable interface. This console 311 facilitates this management capability through the use of a network connection 315 that utilizes a protocol such as a Hyper Text Transfer Protocol (HTTP). Also shown is a service processor broker 312 responsible for executing, monitoring correlation and aggregation policies in a scalable and coordinated manner. These policies relate to one of more hypervisors 301. Further shown, is a service processor registry and proxy service module 313 that is responsible for discovering and registering the sensors and actuators in the distributed system along with their metadata. This module 313 is also responsible for dynamically proxy-ing query calls to appropriate sensors and actuators in the distributed system through the use of the network connection 316. The network connection 316 may be a logical or physical connection. Also shown is a platform sensors and actuators, actuator 314 that includes sensors and actuators used to monitor the service processor 202. The service processor broker 309 and service processor registry and proxy service 310 are used to resolve vertical and horizontal silos across the HW/SW layer of the socket 106, enclosures 101-103, rack 104, container 105, and/or the data center 108 (i.e., collectively remote domains) through the monitoring of sensors and actuators within the various management domains of each of these aforementioned devices.

In some example embodiments, the use of sensors and actuators in the management of the HW/SW layer of these various domains is facilitated through the use of distributed registry functionality. Specifically, a local registry table is maintained by the helper broker 309 and helper registry and proxy services 310. This local registry table is federated or combined with other local registries tables from other service processors using a distributed overlay, wherein the service processors are operatively connected via the network connection 316. Using the network connection 316, the proxy functionality is provided in the system and method by dynamically routing queries in the distributed overlay, and from, for example the service processor 202 to any CPU management domain on a socket, node, or enclosure via the service processor helper 309.

Figure 4:
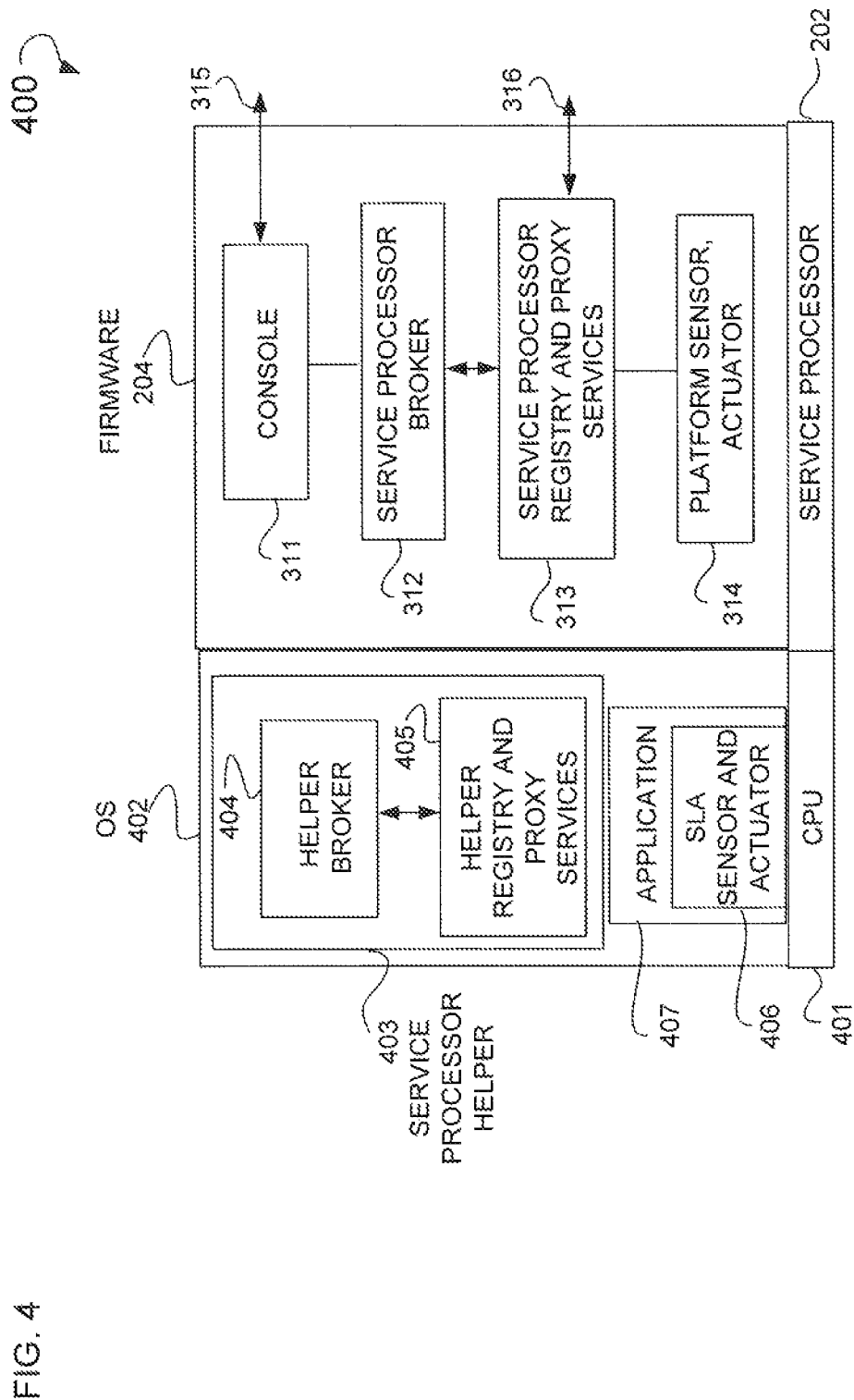
FIG. 4 is a diagram of a software stack, according to an example embodiment, for a system and method for resource management for unified and automated monitoring across the hardware and software stacks in a distributed system, the monitoring occurring for a single Operating System (OS).

FIG. 4 is a diagram of an example software stack 400 for a system and method for resource management for unified and automated monitoring across the hardware and software stacks in a distributed system, the monitoring occurring for a single operating system. Shown is a CPU 401. Residing on top of the CPU 401 is a single OS 402. Residing as part of the single OS 402 is a service processor helper 403. The service processor helper 403 includes a helper broker 404 and a helper registry and proxy service 405. The OS 402 also includes an application 407 and SLA sensor and actuator 406. Data for the CPU 401 and software stack data for the OS 402 may be retrieved using CIMOM in combination with the previously illustrated service processors broker 312, service processor registry and proxy service 313, and platform sensor actuator 314.

FIG. 5 is a diagram of an example console 311 in the form of a GUI used to monitor and manage the HW/SW stack of a plurality of domains. The plurality of domains include HW/SW stacks associated with a cloud. Shown is a unified system status tab 501 that, when executed, displays both HW and SW stack sensor and actuator information for both a local and remote domains. For example, various tabs relates to the NW stack are illustrated, where these tabs display data (i.e., HW stack data) for sensors and actuators related to the system (e.g., the CPU 201), fans, temperatures, power, processors, memory and the Network Interface Card (NIC). These tabs are collectively referenced at 502. Also shown are tabs related to the SW stack and display data (i.e., SW stack data) related to hypervisors and VMs. These tabs are collectively referenced at 503. HW stack data is displayed in a field 504. Hypervisor data is displayed as part of the field 505, while VM data is displayed as part of field 506.

Figure 6:
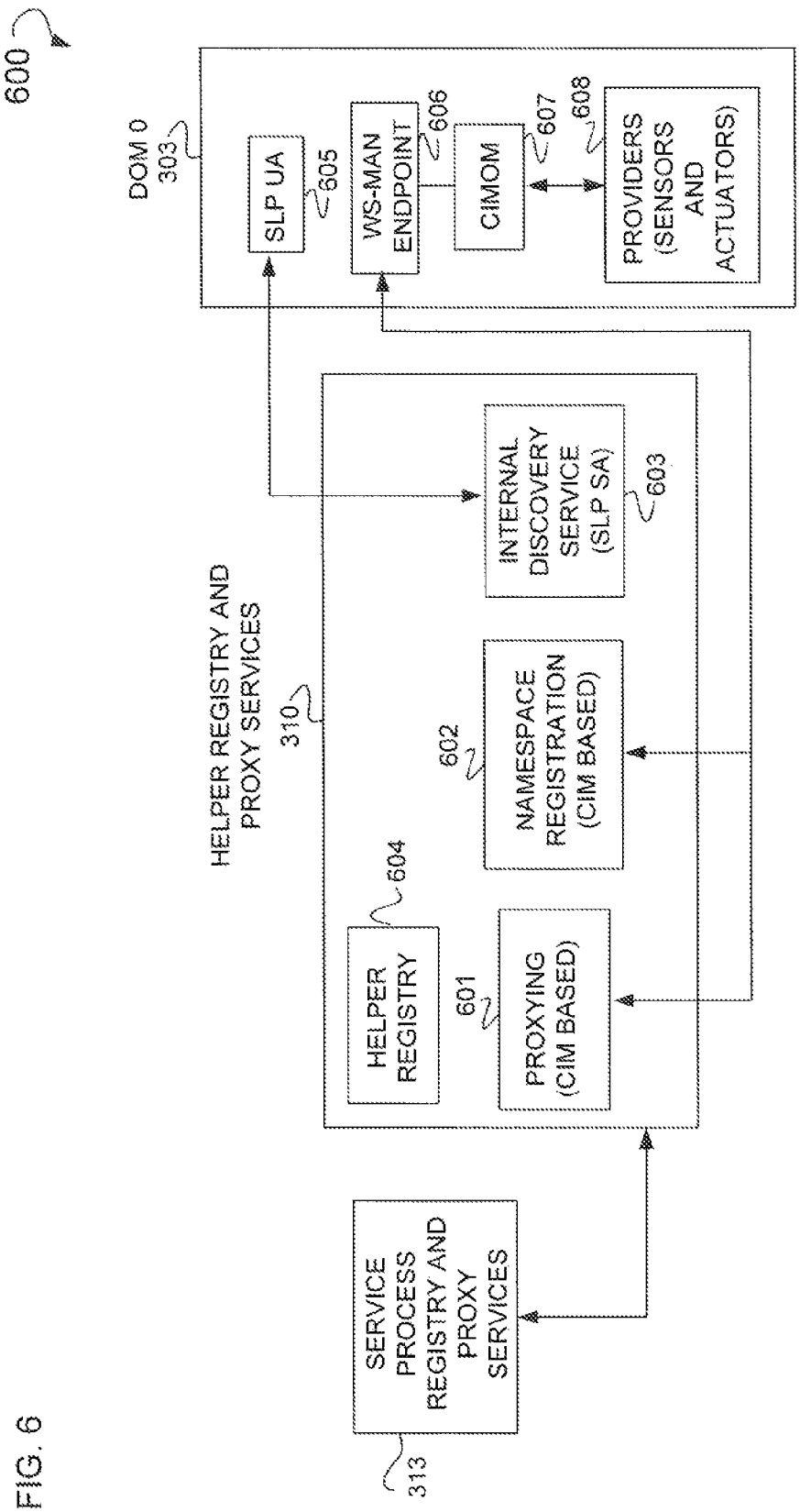
FIG. 6 is a block diagram of an architecture, according to an example embodiment, used in the discovery and monitoring of sensors and actuators with a local domain.

FIG. 6 is a block diagram of an example architecture 600 used in the discovery and monitoring of sensors and actuators with a local domain. Shown is the service processor registry and proxy services 313, helper registry and proxy services 310 and Dom0 303 that are used together to construct the local registry table. The helper registry and proxy services 310 may reside as part of a guest VM 302. In some example embodiments, the helper registry and proxy service 310 executes an internal discovery of management domains (e.g., the guest VM 302, hypervisor 301, and the CPU 202) for that node. It is assumed, for example, that a Web Services-Management (WS-Man) endpoint exists in each management domain(s). In some example embodiments, some other type of protocol may be implemented in lieu of WS-Man. These other types of protocols may include Customer Information Manager/eXtensible Markup Language (CIM/XML), Distributed Component Object Model (DCOM) or Server Management Command Line Protocol (SM CLP). This internal discovery takes place using, for example, SLP (Service Location Protocol).

In one example embodiment, a local registry table is built and maintained as part of a helper registry 604. The data that populates this helper registry 604 may be metadata and/or actual data that identifies management endpoints (e.g., Dom0, guest VMs, or platforms) via a discovery protocol. This discovery protocol may be SLP, Ping Sweep, Web Service (WS)-identify, Domain Name Server/Dynamic Host Control Protocol (DNS/DHCP), or some other suitable protocol. This data is stored in the helper registry 604. Discovery of the management endpoints (e.g., WS-Man) may be conducted using a SLP User Agent (SLP UA) 605 that resides on the Dom0 303 and guest VM 302 and which receives queries from an internal discovery service (SLP SA) 603 that resides as part of the helper registry and proxy services 310. A multicast channel is assumed for the SLP-based discovery of VMs, and Dom0. In order to limit the multicast message to the management domains in that node only, a firewall rule may be introduced in Dom0 303 to drop the forwarding of the message outside of the node. Once the discovery of the management end points by the helper registry and proxy services 310 occurs, a namespace registration occurs using the namespace registration module 602 to query the CIMOM of each WS-Man endpoint 606. Where a namespace is established for each sensor and actuator, the helper registry and proxy service module 310 queries each WS-Man endpoint for each CIMOM to retrieve the namespaces associated with a VM, Dom0, platforms, or other suitable devices and components. Additional processing (e.g., filtering) may be performed on the retrieved namespaces. Further, the discovery of the management endpoints (e.g., WS-Man) at the hardware/platform layer is done by the service processor registry and proxy services 313. The helper registry and proxy services 310 queries the service processor registry and proxy services 313 to retrieve the hardware discovery information, then to populate the helper registry 604 with this discovered data.

FIG. 7 is an example helper registry 604 that includes data for a local domain. Shown are columns 701-704, wherein column 701 includes data for a type of management domain 701, column 702 includes data for addressing a particular management domain, column 703 includes a description for a domain, and column 704 includes a description of a data structure used to access the domain. Regarding column 701, this column includes data relating to the type of management domain, where this domain may be a service processor, Dom0, guest VM, or other suitable domain. Column 702 includes data for addressing a domain, where this address may be an Internet Protocol (IP) address, Media Access Control (MAC) address, Uniform Resource Identifier (URI), or other numeric or alpha-numeric value used to uniquely identify a management domain. The data for column 702 may be retrieved from the WS-Man associated with each of the service processor, Dom0, or VMs. Column 703 includes a description of a management domain, where this description may be versioning information, trade name information, or other suitable information. Column 704 includes namespace registration information retrieved from CIMOM. As is illustrated above, the data included in the helper registry 504 may be displayed as part of the console 311.

Figure 8:
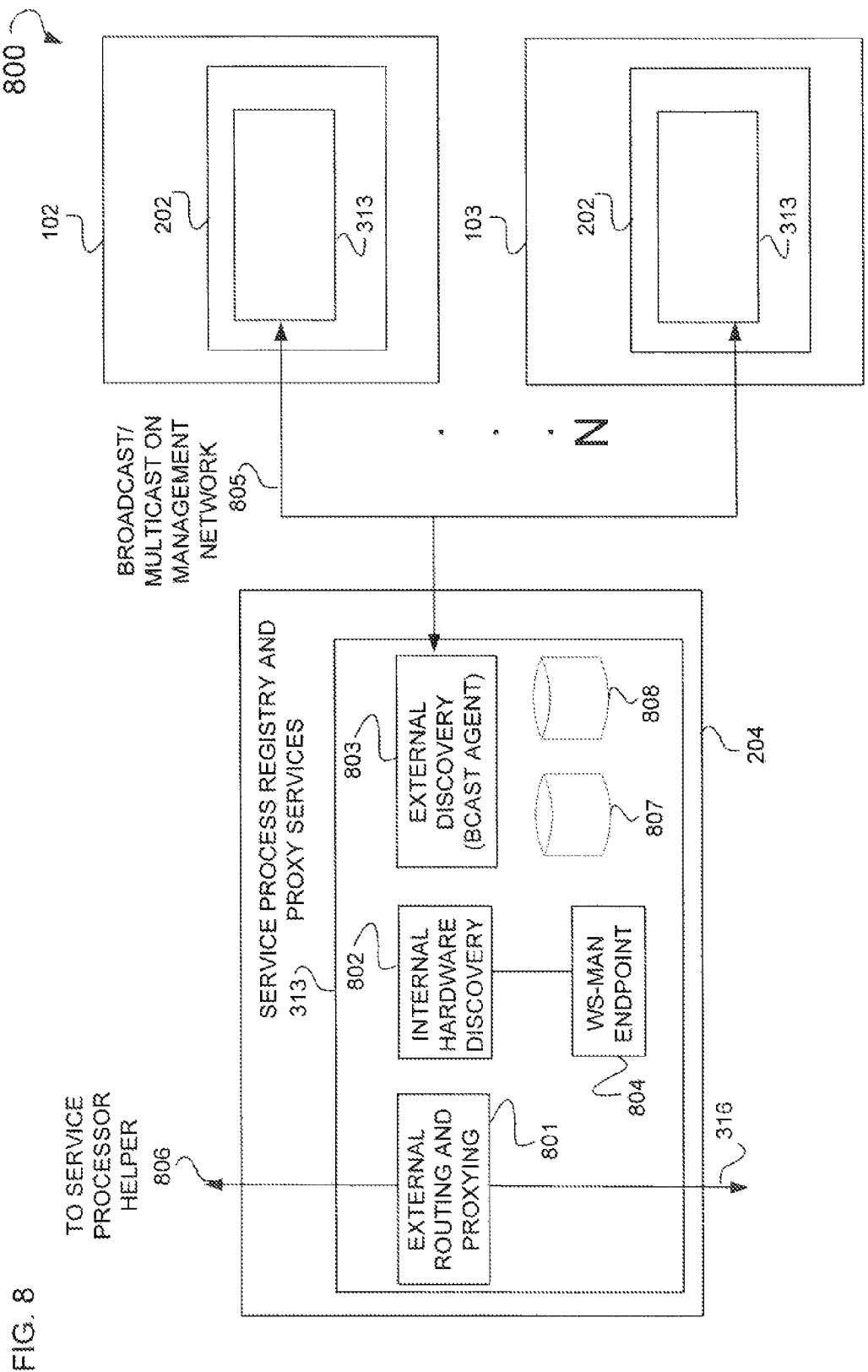
FIG. 8 is a block diagram of an architecture, according to an example embodiment, used in the discovery and monitoring of service processor peers with an enclosure, other remote domains.

FIG. 8 is a block diagram of an example architecture 800 used in the discovery and monitoring of service processor peers within an enclosure, other remote domains. Shown are plurality of enclosures 102-103 that each includes service processors 202, and service processor registry and proxy services 313. Using an external discovery module 803, the other peer service processors can be discovered. In some example embodiments, a multicast/broadcast based mechanism, illustrated at 805, is used amongst the service processor registry and proxy services 310 that resides as part of the service processor helper 304 for each peer to discover each peer. Discovered information is returned (e.g., a broadcast response) that includes, for example, an Internet Protocol (IP) address, Domain Name Server (DNS) name, and/or port value. This discovered information will be placed into a routing table 807. The routing table 807 is used to dynamically route queries from a receiving service processor to a peer service processor. In some example embodiments, the external discovery and external routing can be handled using a distributed overlay such as a Distributed Hash Table (DHT). A distributed overlay can be used by the service processor registry and proxy services 313 to enables each individual service processor to access data from peer service processors and the helper registries associated therewith. Using a data structure such as a array, list, matrix, lookup table or DHT the external routing and proxying module 801 can route a query to the appropriate service processor registry and proxy service 313 of the enclosure 102 using the network connection 316. For example, if a request is made from a service processor of an enclosure or node to access the hypervisor data on another enclosure or node, the DHT is used to route the query through the service processor registry and proxy services module 313 to the service processor of another enclosure or node. The query is then proxy-ed through the service processor helper 304 of that node or enclosure to the CIMOM 507 in Dom0 303 of that node or enclosure. The response may be returned back via the same path. In some example embodiments, the service processor registry and proxy module 313 helps in the proxying of calls to other peer service processors, and also redirects calls to service processor helpers for access to data from individual CPU management domains (e.g., guest VMs, Dom0). This redirecting of calls may be facilitated through the use of the network connection 806. In some example embodiments, the registration process is repeated periodically using a lease-based mechanism so as to support dynamism occurring in the system (e.g., VMs entry/exit/migrations, HW upgrades etc.). The internal hardware discovery module 802, stores the discovered hardware management endpoints that include WS-Man endpoints associated with the service processor 202. In some example embodiments, the discovery of hardware management endpoints can be performed using the Platform Management Components Intercommunication (PMCI) standard. The information/data in the internal hardware registry 808 can be provided to the helper registry and proxy services 310. When a query is received by the service processor, the service processor determines whether the query is for "this" (i.e., the receiving) processor. If not, then the external routing and proxying module 801 accesses the routing table 807 to determine which service process or to which to forward the query.

Figure 9:
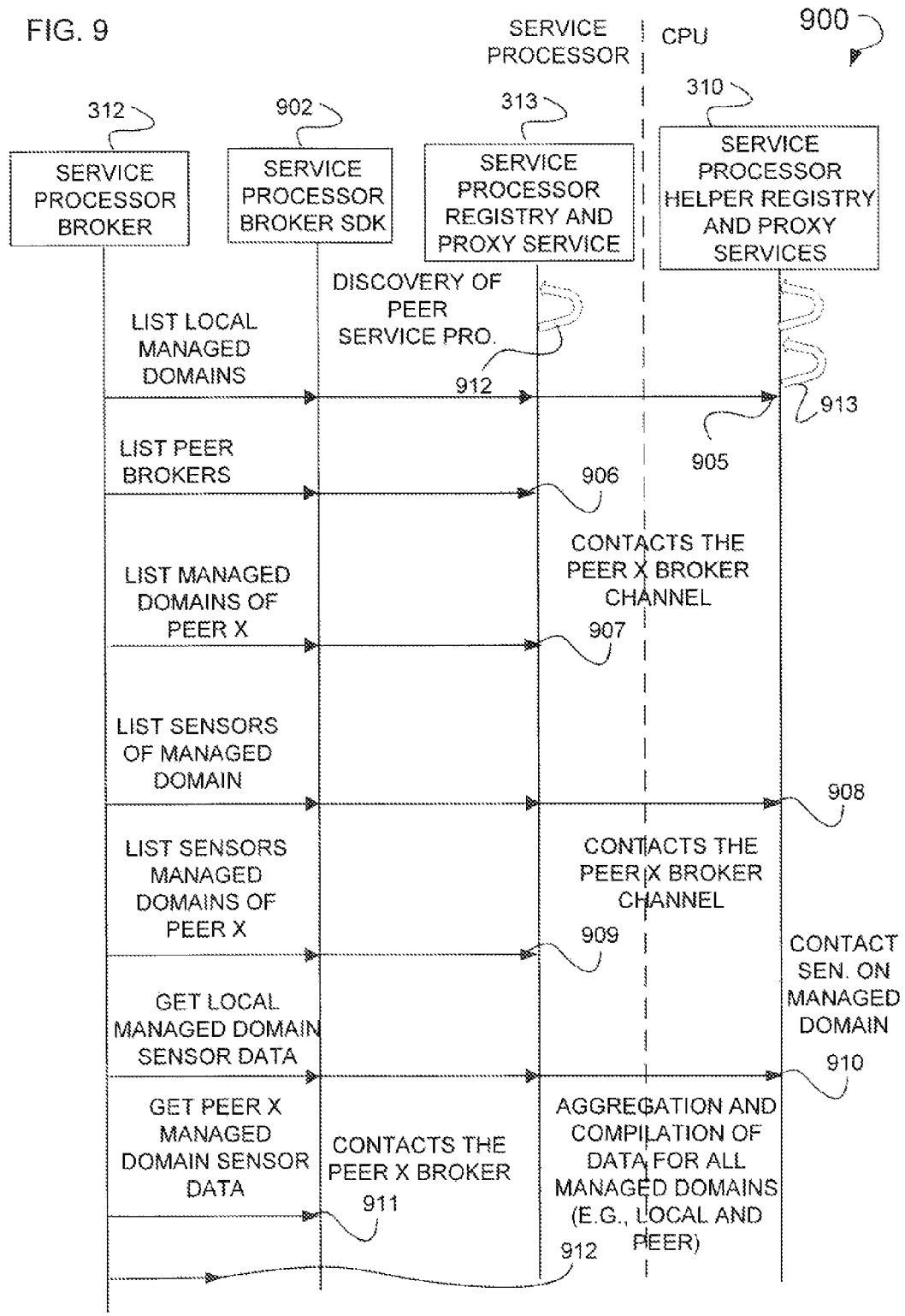
FIG. 9 is a sequence diagram illustrating a method, according to an example embodiment, for distributed monitoring across the HW/SW stacks.

FIG. 9 is a sequence diagram illustrating an example method 900 for distributed monitoring across the HW/SW stacks. The steps shown are in response to a query at one of the service processors 202 in a distributed system to provide/display aggregated data across HW/SW stack for an enclosure. This includes data from the individual hardware in the enclosure, but also data from software that includes the hypervisor, and individual guest VMs. Shown are the service processor broker 312, service processor Software Development Kit (SDK) 902, and service processor registry and proxy service 313 each of which resides on the service processor 202. Also shown are the service processor helper registry and proxy service 310 each of which resides on the CPU 201. These various modules are executed as part of the method 900. Further, as denoted at 912 and 913, the discovery of peer service processors and managed domains may occur on a continuous basis that is repeated periodically using a lease-based mechanism so as to support dynamism occurring in the system (e.g., VMs entry/exit/migrations, HW upgrades etc.).

In some example embodiments, a query is received by the service processor broker 312. The service processor broken 312 uses the service processor broker SDK 902 and the service processor registry and proxy service 313 to handle the query. The service processor broker SDK 902 may be accessed using the following Application Programming Interfaces (APIs):
int getManagedDomains(domainList&);
int getManagedDomains(domainList&, domainFilter&);
int getManagedDomains(domainList&, string);
int getSensorsList(sensors List&, string, int);
int getActuatorList(actuatorList&, string);
int callActuator(string, string, string, actuatorParamList&, actuatorParamList&);
int registerSensor(string, string, string[ ], int, int, void (*callFunction)(sensorData&));
int unregisterSensor(string, string);
int unregisterSensor(int).
At 905, the service processor broker 312 calls the SDK APIs to list the local managed domains. The SDK, in turn, makes calls to the service processor registry and proxy service 313 to obtain the requested information. The service processor registry and proxy service 313 makes calls to the service processor helper registry and proxy services 310 to return the requested information from the CPU (e.g., CPU 201). As shown at 906, a list of peer brokers can be provided by the service processor broker 312 in response to a query. Illustrated at 907 is a list of managed domains of a particular peer service processor that can be provided in response to a query. The query may be re-directed via the network connection 316, acting as a broker channel, to another peer service processor. The sequences shown at 905-907 may utilize registry information from the internal hardware registry 808 and the routing table 807. Shown at 908 is a list of sensors and actuators for a domain managed by a service processor, the list of sensors and actuators provided in response to an initial query. The query may be re-directed via the network connection 316, acting as a broker channel, to another peer service processor. This list of sensors and actuators may be provided to both the service processor registry and proxy service 313 and the service processor helper registry and proxy service 310. The sequence illustrated at 909 shows a list of sensors and actuators managed domains of peers of the service processors responding to the query. This list of sensors and actuators is provided via the network connection 316 acting as a broker channel. The sequences shown at 908 and 909 may use a namespace based query to obtain the list of sensors of the managed domain, and the list of sensors managed domains of a peer. Shown at 910 is local managed sensors and actuators domain data that is retrieved in response to a query. Further, using this data, the service processor registry and proxy service 313 may contact the sensors and actuators on the domain managed by the service processor responding to the query. Further, as shown at 911 domain sensor and actuator data managed by a peer service processor may also be retrieved. The sequences illustrated at 910 and 911 may use a method associated with the namespaces to get the requested data. As illustrated at 912, the data retrieved at 910 may be aggregated and compiled for future use and analysis.

Figure 10:
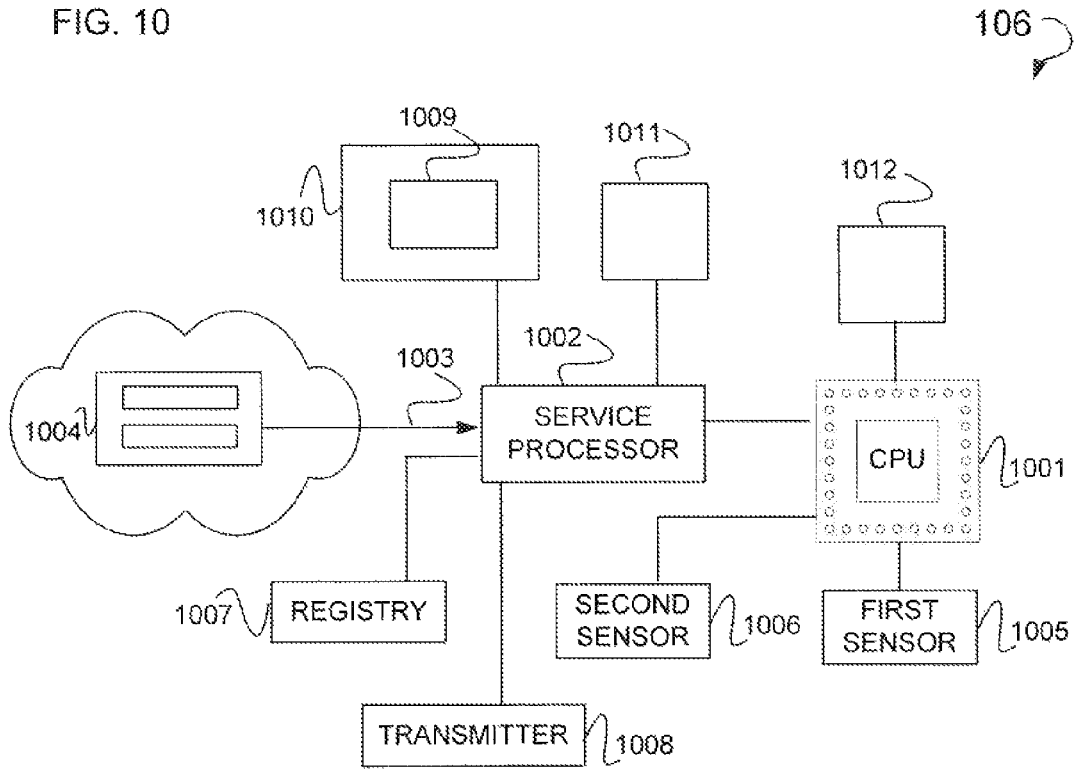
FIG. 10 is a block diagram of a computer system, according to an example embodiment, in the form of the service processor used to retrieve sensor data.

FIG. 10 is a block diagram of an example computer system in the form of the service processor and associated socket 106 used to retrieve sensor data. These various blocks may be implemented in hardware, firmware, or software as part of the enclosure 101, or enclosure 102. Further, these various blocks are logically or physically (i.e., operatively connected) connected. Shown is a processor 1001 and service processor 1002 co-located on a common socket 106, the service processor 1002 to aggregate data from a distributed network 1003 of additional service processors and processors both of which are co-located on an additional common socket 1004. Operatively connected to the processor 1001 is a first sensor 1005 to record the data from the processor 1001. Operatively connected to the processor 1001 is a second sensor 1006 to record the data from a software stack. Operatively connected to the service processor 1002 is a registry 1007 to store the data. Operatively connected to the service processor 1002 is a transmitter 1008 to transmit the aggregated data for display on a console. Also illustrated is an internal discovery service 1009 that resides as part of a service processor helper 1010, the internal discovery service 1009 to identify software associated with the software stack. Additionally, the service processor helper 1010 may facilitate namespace recognition. Further shown is a service processor registry and proxy services module 1011 that resides on the service processor 1002, the service processor registry and proxy services module 1011 to retrieve additional data, that relates to the additional processor and an additional software stack residing on the additional processor, for display on a console. Moreover, shown is a service processor helper 1012 that resides on the processor 1001, the service processor helper 1012 to query the software stack. In some example embodiments, the service processor helper 1012 queries the software stack through the use of a CIM based namespace. In some example embodiments, the data from the processor 1001 includes at least one of power usage data, temperature data, memory usage data, or processor cycle data. Some example embodiments include the data from the software stack includes at least one of software application name data, memory allocation data, software execution time data, or SLA compliance data. Additionally, the software stack may include at least one of an operating system, VM, or a hypervisor.

Figure 11:
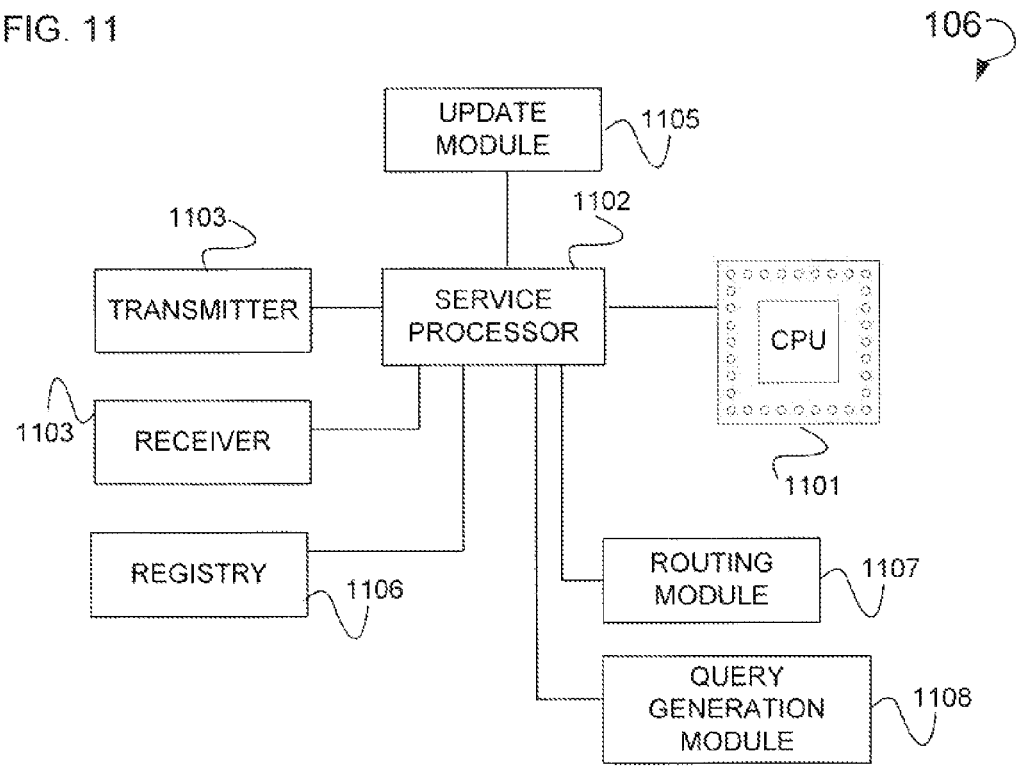
FIG. 11 is a block diagram of a computer system, according to an example embodiment, in the form of the service processor used to forward a sensor data query.

FIG. 11 is a block diagram of an example computer system in the form of service processor and associated socket 106 used to forward a sensor data query. These various blocks may be implemented in hardware, firmware, or software as part of the enclosure 101, or enclosure 102. Shown is a processor 1101 operatively connected to a service processor 1102 co-located on a common socket 106. Operatively connected to the service processor 1102 is a transmitter 1103 (see e.g., the service processor registry and proxy services module 313) to transmit a peer discovery query to identify at least one processor and service processor co-located on a common socket, the processor and the service processor including at least one data sensor. Operatively connected to the service processor is a receiver 1104 to receive a response to the peer discovery query, the response identifying the at least one data sensor and the processor and the service processor co-located on the common socket. Operatively connected to the service processor 1102 is an update module 1105 to update a registry 1106 with the response, the registry accessible by the processor 1101 and service processor 1102 co-located on the common socket 106. In some example embodiments, the receiver 1104 receives an additional peer discovery query seeking sensor data related to an additional processor and service processor co-located on an additional common socket. Operatively connected to the service processor 1102 is a routing module 1107 (see e.g., the routing table 707) to route the additional peer discovery query to the additional processor and service processor co-located on the additional common socket. In some example embodiments, transmitting by the transmitter 1103 includes at least one of broadcasting, multicasting, or unicasting. In some example embodiments, the peer includes at least one of the additional processor and service processor co-located on an additional common socket, the at least one of the additional processor and service processor are part of a distributed network. Further, the at least one data sensor may record data for either the processor or a software stack residing on the processor. Operatively connected to the service processor 1102 is a query generation module 1108 to generate an additional peer discovery query seeking sensor data related to an additional processor and service processor co-located on an additional common socket, the peer discovery query generated using a CIM namespace. Operatively connected to the service processor 1102 is the routing module 1107 (see e.g., the external routing and proxying module 801) to route the peer discovery query to the additional processor and service processor co-located on an additional common socket using a DHT.

Figure 12:
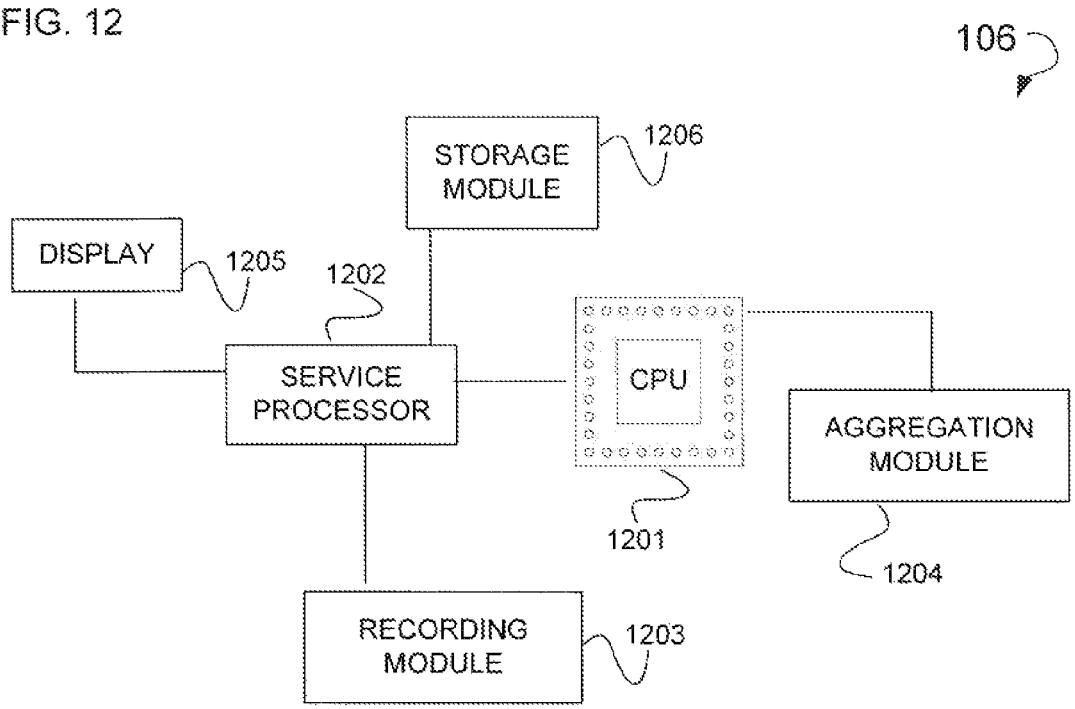
FIG. 12 is a block diagram of a computer system, according to an example embodiment, in the form of the service processor used to forward a sensor data query.

FIG. 12 is a block diagram of an example computer system in the form of the service processor and associated socket 106 used to forward a sensor data query. These various blocks may be implemented in hardware, firmware, or software as part of the enclosure 101, or enclosure 102. Processor 1201 is operatively connected to a service processor 1202. Operatively connected to the service processor 1202 is a recording module 1203 to record sensor data for the processor 1201 and associated software stack, the processor 1201 and a service processor 1202 co-located on a common socket. Operatively connected to the processor 1201 is an aggregation module 1204 to aggregate the sensor data for a processor and the associated software stack into a registry. Operatively connected to the service processor 1202 is a display 1205 to display the aggregated sensor data in console through accessing the registry via the service processor 1202. Operatively connected to the service processor 1202 is a storage module 1206 to store the sensor data in the registry using a service processor helper that resides on the processor 1201. In some example embodiments, the service processor helper resides as part of an operating system, a Dom0, or a hypervisor. In some example embodiments, the sensor data includes data relating to at least one of power usage, temperature, memory usage, processor cycles, a software application name, memory allocation, or software execution time. In some example embodiments, the console 311 includes at least one of a GUI, or a Command Line Interface (CLI).

Figure 13:
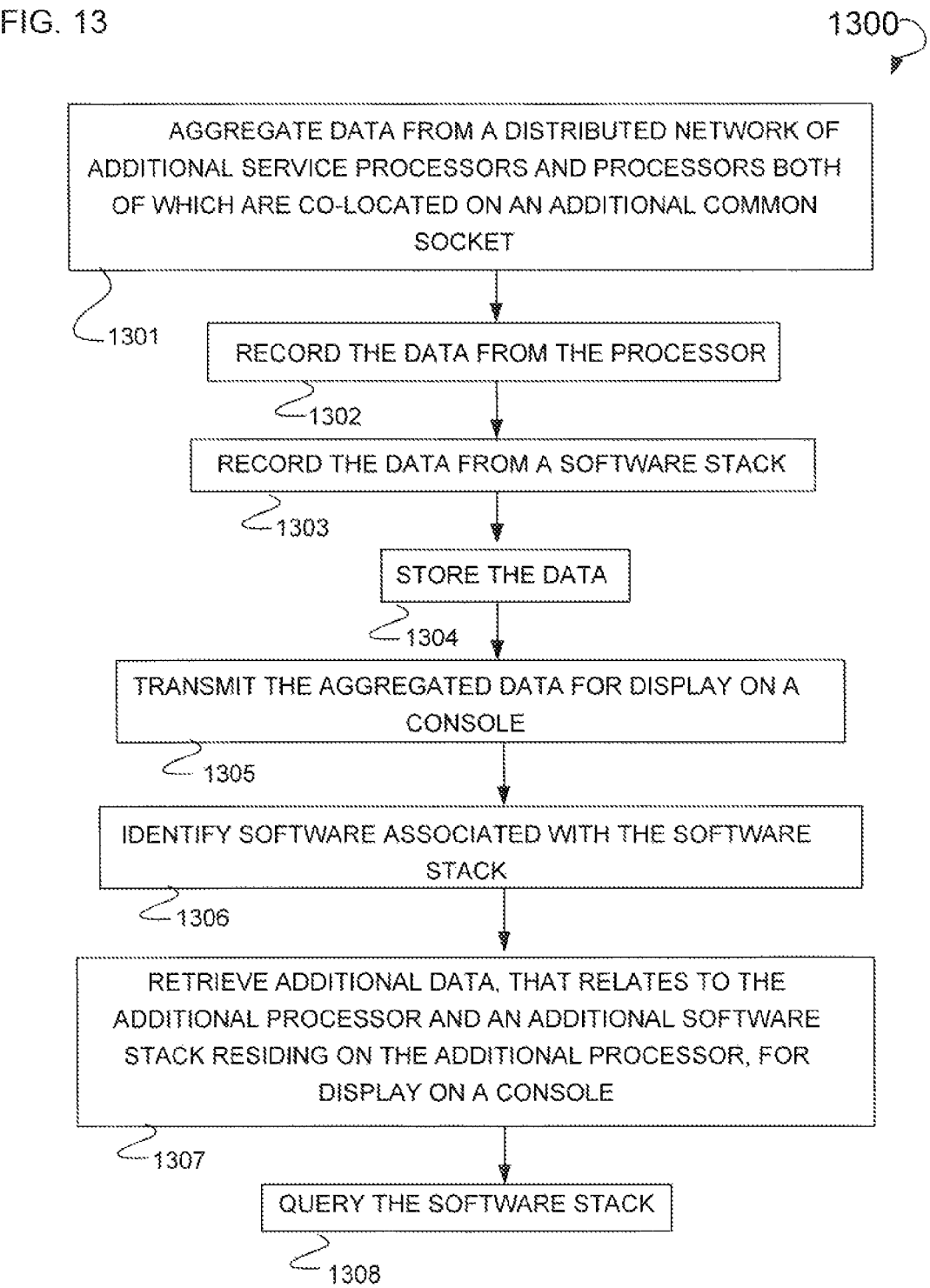
FIG. 13 is a flow chart illustrating a method, according to an example embodiment, to retrieve and store sensor data.

FIG. 13 is a flow chart illustrating an example method 1300 to retrieve and store sensor data. This method may be executed by the service processor 202. Operation 1301 is executed by a service processor 1002 to aggregate data from a distributed network of additional service processors and processors both of which are co-located on an additional common socket. Operation 1302 is executed by a first sensor 1005 to record the data from the processor. Operation 1303 is executed by the second sensor 1006 to record the data from a software stack. Operation 1304 is executed by the registry 1007 to store the data. Operation 1305 is executed by the transmitter 1008 to transmit the aggregated data for display on a console. Operation 1306 is executed by the internal discovery service 1009 to identify software associated with the software stack. Operation 1307 is executed by the service processor registry and proxy services module 1011 to retrieve additional data that relates to the additional processor and an additional software stack residing on the additional processor, for display on a console. Operation 1308 is executed by the service processor helper 1012 to query the software stack. In some example embodiments, the service processor helper queries the software stack through the use of a CIM based namespace. In some example embodiments, the data from the processor includes at least one of power usage data, temperature data, memory usage data, or processor cycle data. In some example embodiments, the data from the software stack includes at least one of software application name data, memory allocation data, software execution time data, or SLA compliance data. In some example embodiments, the software stack includes at least one of an operating system, a VM, or a hypervisor.

FIG. 14 is a flow chart illustrating an example method 1400 used to forward a sensor data query. This method 1400 may be executed by the service processor 202. Operation 1401 is executed by the transmitter 1103 to transmit a peer discovery query to identify at least one processor and service processor co-located on a common socket, the processor and the service processor including at least one data sensor. Operation 1402 is executed by the receiver 1104 to receive a response to the peer discovery query, the response identifying the at least one data sensor and the processor and the service processor co-located on the common socket. Operation 1403 is executed by the update module 1105 to update a registry with the response, the registry accessible by the processor and service processor co-located on the common socket. Operation 1404 is executed by the receiver 1104 to receive an additional peer discovery query seeking sensor data related to an additional processor and service processor co-located on an additional common socket. Operation 1405 is executed by the routing module 1107 to route the additional peer discovery query to the additional processor and service processor co-located on the additional common socket. In some example embodiments, transmitting includes at least one of broadcasting, multicasting, or unicasting. In some example embodiments, the peer includes at least one of the additional processor and service processor co-located on an additional common socket, the at least one of the additional processor and service processor are part of a distributed network. In some example embodiments, the at least one data sensor records data for either the processor or a software stack residing on the processor. Operation 1406 is executed by a query generation module 1108 to generate an additional peer discovery query seeking sensor data related to an additional processor and service processor co-located on an additional common socket, the peer discovery query generated using a CIM namespace. Operation 1407 is executed by a routing module 1109 to route the peer discovery query to the additional processor and service processor co-located on an additional common socket using a DHT.

Figure 15:
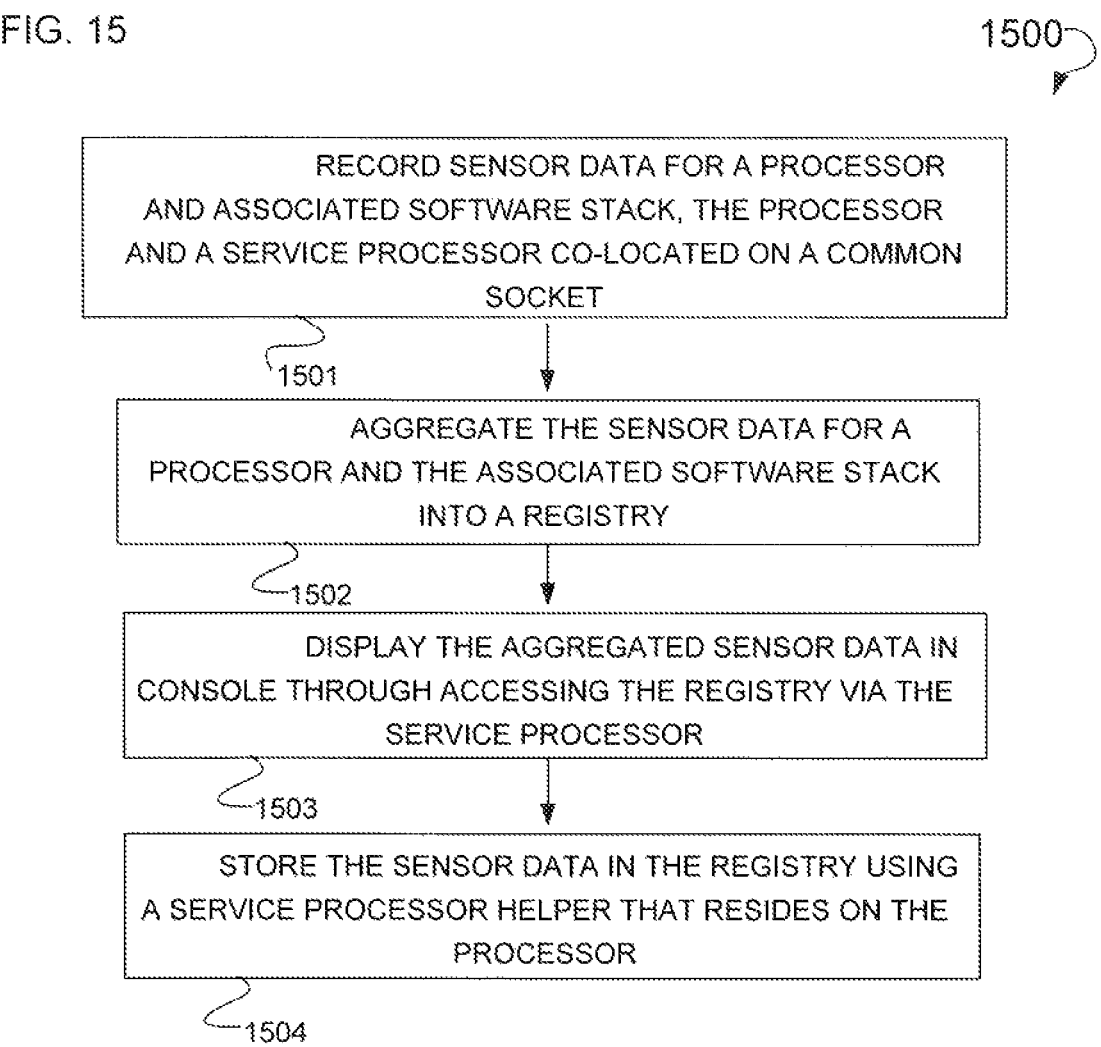
FIG. 15 is a flow chart illustrating a method, according to an example embodiment, executed to forward a sensor data query.

FIG. 15 is a flow chart illustrating an example method 1500 executed to forward a sensor data query. This method 1500 may be executed by the service processor 202. Operation 1501 is executed by a recording module 1203 to record sensor data for a processor and associated software stack. Operation 1502 is executed by the aggregation module 1204 to aggregate the sensor data for a processor and the associated software stack into a registry. Operation 1503 is executed by the display 1205 to display the aggregated sensor data in console through accessing the registry via the service processor. Operation 1504 is executed by the storage module 1206 to store the sensor data in the registry using a service processor helper that resides on the processor. In some example embodiments, the service processor helper resides as part of an operating system, a Dom0, or a hypervisor. In some example embodiments, the sensor data includes data relating to at least one of power usage, temperature, memory usage, processor cycles, a software application name, memory allocation, or software execution time. In some example embodiments, the console includes at least one of a GUI, or a CLI.

Figure 16:
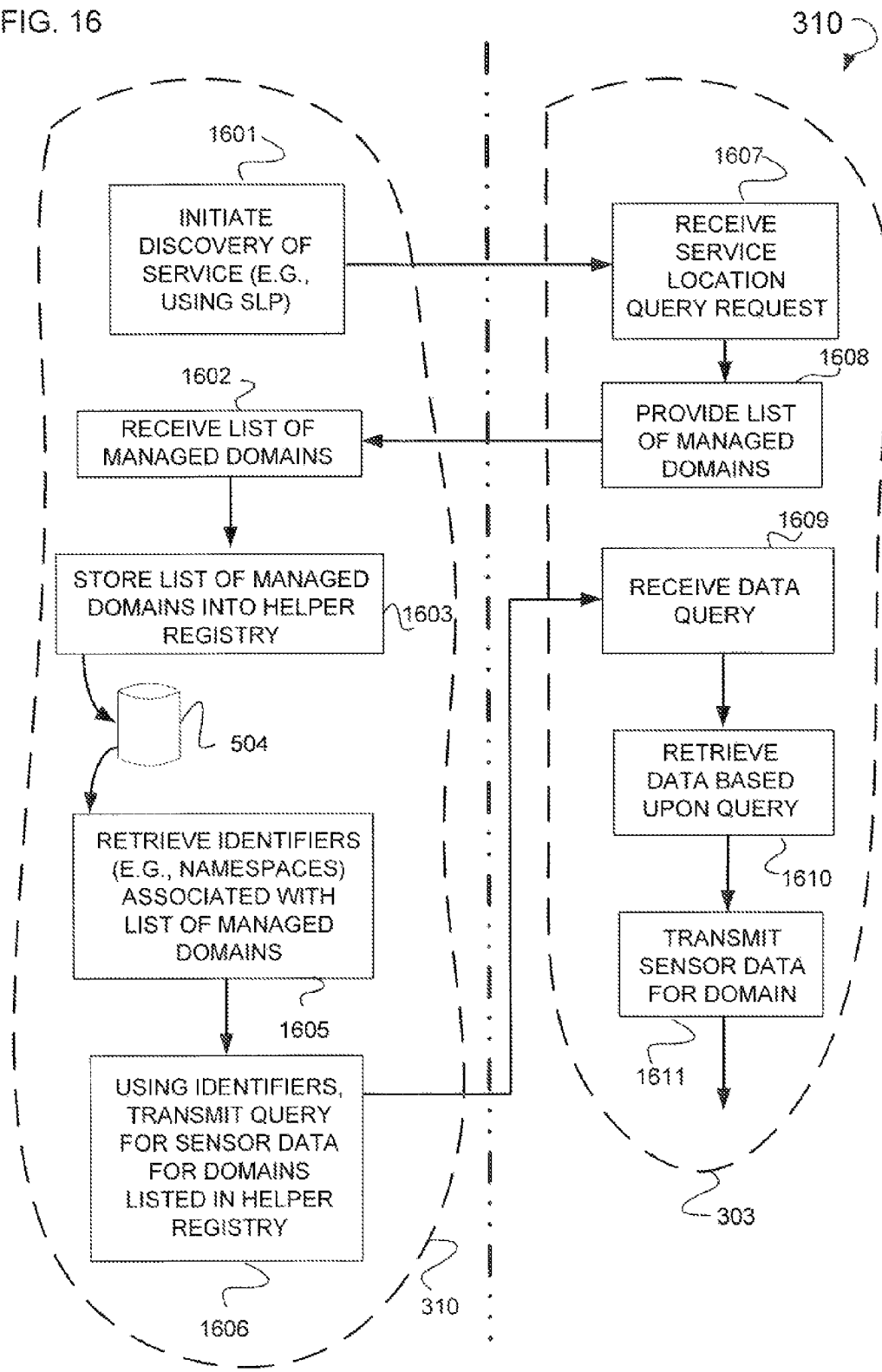
FIG. 16 is a dual-stream flow chart illustrating a method, according to an example embodiment, for the helper registry and proxy services.

FIG. 16 is a dual-stream flow chart illustrating an example method for the helper registry and proxy services 310. Shown are various operations 1601-1603, and 1605-1606 that are executed as part of the helper registry and proxy services 310. Also shown are operations 1607-1611 that are executed by the Dom0 303. Operation 1601 is executed to initiate the discovery of a service. Operation 1607 is executed to receive a service location request seeking to identify the location of a service on a CPU. Operation 1608 is executed to provide a list of managed domains (e.g., software) that are managed by the CPU. Operation 1603 is executed to store the list of managed domains into a helper registry 504. Operation 1605 is executed to retrieve identifiers associated with the list of managed domains. These identifiers may be interfaces used to get data regarding the managed domains from a service processor. Operation 1606 is executed to transmit a query for sensor and actuator data from the domains listed in the helper registry. Operation 1609 is executed to receive query data, and retrieve data based upon the query. Operation 1610 is executed to transmit sensor and actuator data for the domain to the requesting service processor.

Figure 17:
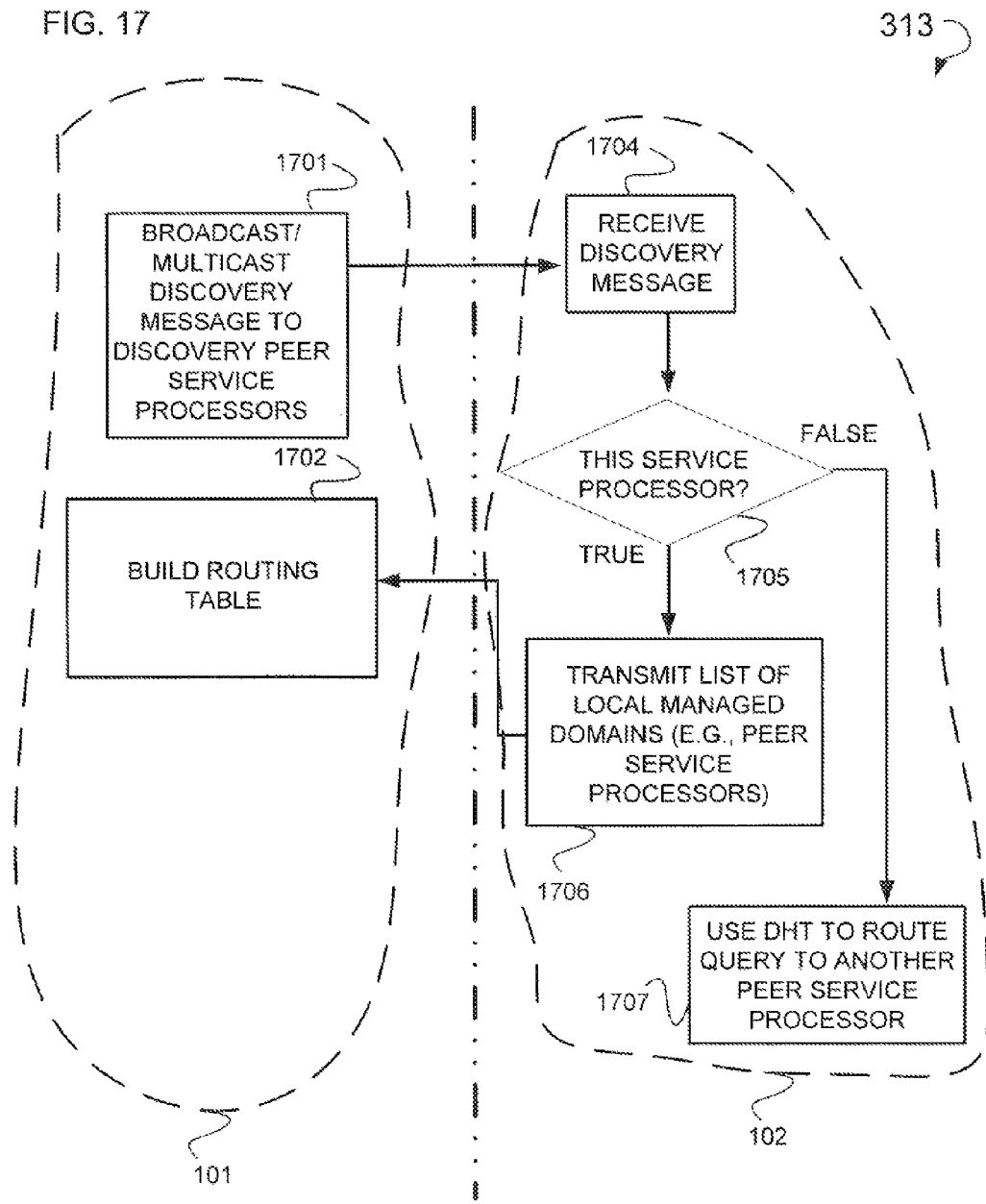
FIG. 17 is a dual-stream flow chart illustrating a method, according to an example embodiment, for a service processor registry and proxy services.

FIG. 17 is a dual stream flow chart illustrating an example method for the service processor registry and proxy services 313. Shown are operations 1701-1702 that are executed by the enclosure 101. Also shown are operations 1704-1707 that are executed by the enclosure 102. Operation 1701 is executed to broadcast or multicast a discovery message to discover peer service processors. Operation 1704 is executed to receive a discovery message. Decision operation 1705 is executed to determine if the discovery message is intended for this (i.e., the receiving service processor) service processor. In cases where the decision operation evaluates to "true," an operation 1706 is executed. In cases where the decision operation evaluates to "false," an operation 1707 may be executed. Operation 1706, when executed, transmits a list of local managed domains in the form of peer service processors. Operation 1707 may use a routing regime such as DHT to route a query or discovery message. Operation 1702 is executed to build the routing table 807 using the list of local managed domains in the form of peer service processors.

Operation 1703 is executed to display the list of sensor and actuator managed domains as part of the console.

Figure 18:
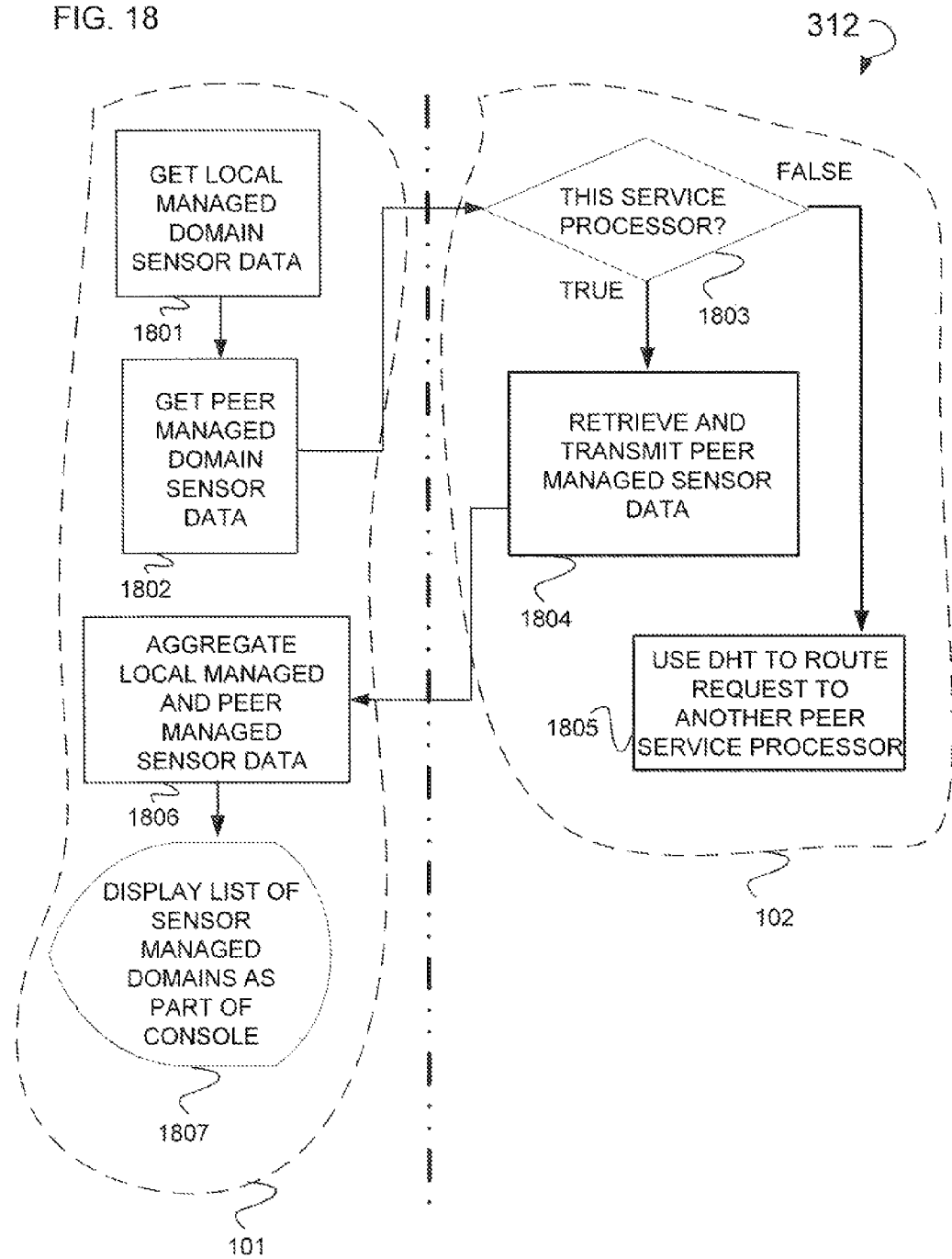
FIG. 18 is a dual-stream flow chart illustrating a method, according to an example embodiment, for a service processor broker.

FIG. 18 is a dual-stream flow chart illustrating an example method for the service processor broker 312. Shown are operations 1801-1802 and 1806-1807. These operations may be executed by the enclosure 101. Also shown are operations 1803-1804 and 1805 that may be executed by the enclosure 102. Operation 1801 is executed to get the local managed domain sensor data. Operation 1802 is executed to get the peer managed domain sensor data. Operation 1801 corresponds to the sequence illustrated at 910, while operation 1802 corresponds to the sequence illustrated at 911. Decision operation 1803 is executed to determine whether the query transmitted, as part of the execution of operation 1802, is for the receiving enclosure 102 and the service processor(s) associated therewith. In cases where decision operation 1803 evaluates to "true," operation 1804 is executed. In cases where decision operation 1803 evaluates to "false," operation 1805 is executed. Operation 1805 is executed to use DHT or some other data structure to route the get command (i.e., the request) to another peer service processor. Operation 1804 is executed to retrieve the peer managed domain sensor data for this enclosure and to transmit this data to the requesting enclosure or device. Operation 1806 is executed to aggregate the local and peer managed sensor data. This aggregated local and peer managed sensor data is formatted and transferred for display as part of a console as illustrated at 1807. Formatting may include the use of a Hyper Text Markup Language (HTML) or XML to organize the data as part of a webpage. This webpage then being made accessible to, for example, a computer system, cell phone, smart phone, or other device capable of displaying a web page.

FIG. 19 is a diagram of an example computer system 1900. Shown is a CPU 1901. The processor die 201 may be a CPU 1901. In some example embodiments, a plurality of CPU may be implemented on the computer system 1900 in the form of a plurality of core (e.g., a multi-core computer system), or in some other suitable configuration. Some example CPUs include the x86 series CPU. Operatively connected to the CPU 1901 is Static Random Access Memory (SRAM) 1902. Operatively connected includes a physical or logical connection such as, for example, a point to point connection, an optical connection, a bus connection or some other suitable connection. A North Bridge 1904 is shown, also known as a Memory Controller Hub (MCH), or an Integrated Memory Controller (IMC), that handles communication between the CPU and PCIe, Dynamic Random Access Memory (DRAM), and the South Bridge. An ethernet port 1905 is shown that is operatively connected to the North Bridge 1904. A Digital Visual Interface (DVI) port 1907 is shown that is operatively connected to the North Bridge 1904. Additionally, an analog Video Graphics Array (VGA) port 1906 is shown that is operatively connected to the North Bridge 1904. Connecting the North Bridge 1904 and the South Bridge 1911 is a point to point link 1909. In some example embodiments, the point to point link 1909 is replaced with one of the above referenced physical or logical connections. A South Bridge 1911, also known as an I/O Controller Hub (ICH) or a Platform Controller Huh (PCH), is also illustrated. A PCIe port 1903 is shown that provides a computer expansion port for connection to graphics cards and associated GPUs. Operatively connected to the South Bridge 1911 are a High Definition (HD) audio port 1908, boot RAM port 1912, PCI port 1910, Universal Serial Bus (USB) port 1913, a port for a Serial Advanced Technology Attachment (SATA) 1914, and a port for a Low Pin Count (LPC) bus 1915. Operatively connected to the South Bridge 1911 is an Input/Output (I/O) controller

1916 to provide an interface for low-bandwidth devices (e.g., keyboard, mouse, serial ports, parallel ports, disk controllers). Operatively connected to the Super I/O controller 1916 is a parallel port 1917, and a serial port 1918.

The SATA port 1914 may interface with a persistent storage medium (e.g., an optical storage devices, or magnetic storage device) that includes a machine-readable medium on which is stored one or more sets of instructions and data structures (e.g., software) embodying or utilized by any one or more of the methodologies or functions illustrated herein. The software may also reside, completely or at least partially, within the SRAM 1902 and/or within the CPU 1901 during execution thereof by the computer system 1900. The instructions may further be transmitted or received over the 10/100/1000 ethernet port 1905, USB port 1913 or some other suitable port illustrated herein.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Data and instructions (of the software) are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A computer system comprising:
   a processor and service processor co-located on a common socket, the service processor to aggregate data from a distributed network of additional service processors and processors both of which are co-located on an additional common socket;
   a service processor registry and proxy services module that resides on the service processor to register discovered sensors in the distributed network;
   a first sensor to record the data from the processor;
   a second sensor to record the data from a software stack;
   a registry to store the data from the processor and the data from the software stack; and
   a broker module that resides on the service processor to redirect query calls directly to appropriate sensors among the discovered sensors, based on aggregation policies.

2. The computer system of claim 1, wherein the service processor registry and proxy services module retrieves additional data, that relates to the additional processors and an additional software stack residing on the additional processors, for display on a console.

3. The computer system of claim 1, further comprising a service processor helper that resides on the processor, the service processor helper to query the software stack.

4. The computer system of claim 3, wherein the service processor helper queries the software stack through the use of a Common Information Model (CIM) based namespace.

5. The computer system of claim 1, wherein the data from the processor includes at least one of power usage data, temperature data, memory usage data, or processor cycle data.

6. The computer system of claim 1, wherein the data from the software stack includes at least one of software application name data, memory allocation data, software execution time data, or Service Level Agreement (SLA) compliance data.

7. The computer system of claim 1, wherein the software stack includes at least one of an operating system, a Virtual Machine (VM), or a hypervisor.

8. A computer implemented method comprising:
   transmitting a peer discovery query on a continuous basis, to identify at least one processor and service processor co-located on a common socket, the processor and the service processor including at least one data sensor;
   receiving a response to the peer discovery query, the response identifying the at least one data sensor and the processor and the service processor co-located on the common socket;
   updating a registry with the response, the registry accessible by the processor and service processor co-located on the common socket; and
   redirecting query calls directly to appropriate sensors among a number of discovered sensors, based on aggregation policies and using a service processor broker located on the service processor.

9. The computer implemented method of claim 8, further comprising:
   receiving an additional peer discovery query seeking sensor data related to an additional processor and service processor co-located on an additional common socket; and
   routing the additional peer discovery query to the additional processor and service processor co-located on the additional common socket.

10. The computer implemented method of claim 8, wherein transmitting includes at least one of broadcasting, multicasting, or unicasting.

11. The computer implemented method of claim 8, wherein the peer includes at least one of the additional processor and service processor co-located on an additional common socket, the at least one of the additional processor and service processor are part of a distributed network.

12. The computer implemented method of claim 8, wherein the at least one data sensor records data for either the processor or a software stack residing on the processor.

13. The computer implemented method of claim 8, further comprising generating an additional peer discovery query seeking sensor data related to an additional processor and service processor co-located on an additional common socket, the peer discovery query generated using a Common Information Model (CIM) namespace.

14. The computer implemented method of claim 8, further comprising routing the peer discovery query to the additional processor and service processor co-located on an additional common socket using a Distributed Hash Table (DHT).

15. A computer implemented method comprising:
discovering registered sensors in a distributed network using a service processor registry and proxy services module residing on a service processor;
recording sensor data for a processor and associated software stack, the processor and the service processor co-located on a common socket within the distributed network;
aggregating the sensor data for the processor and the associated software stack into a registry;
displaying the aggregated sensor data in a console through accessing the registry via the service processor; and
redirecting query calls directly to appropriate sensors among the registered sensors, based on aggregation policies and using a service processor broker located on the service processor.

16. The computer implemented method of claim 15, further comprising storing the sensor data in the registry using a service processor helper that resides on the processor.

17. The computer implemented method of claim 16, wherein the service processor helper resides as part of an operating system, a domain, or a hypervisor.

18. The computer implemented method of claim 15, wherein the sensor data includes data relating to at least one of power usage, temperature, memory usage, processor cycles, a software application name, memory allocation, or software execution time.

19. The computer implemented method of claim 15, wherein the console includes at least one of a Graphical User Interface (GUI), or a Command Line Interface (CLI).

20. The computer system of claim 1, further comprising a transmitter to transmit the aggregated data for display on a console.

21. The computer system of claim 1, further comprising an internal discovery service that resides as part of a service processor helper, the internal discovery service to identify software associated with the software stack.

* * * * *